US012620396B2

(12) United States Patent
Gowda et al.

(10) Patent No.: US 12,620,396 B2
(45) Date of Patent: May 5, 2026

(54) ELECTRONIC DEVICE AND CONTROLLING METHOD OF ELECTRONIC DEVICE

(71) Applicant: Samsung Electronics Co., Ltd., Suwon-si (KR)

(72) Inventors: Dhananjaya Nagaraja Gowda, Suwon-si (KR); Jiyeon Kim, Suwon-si (KR); Abhinav Garg, Suwon-si (KR); Chanwoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 221 days.

(21) Appl. No.: 18/669,069

(22) Filed: May 20, 2024

(65) Prior Publication Data

US 2024/0312457 A1 Sep. 19, 2024

Related U.S. Application Data

(63) Continuation of application No. PCT/KR2024/000350, filed on Jan. 8, 2024.

(30) Foreign Application Priority Data

Jan. 9, 2023 (KR) ........................ 10-2023-0002862

(51) Int. Cl.
*G10L 15/22* (2006.01)
*G10L 15/06* (2013.01)

(52) U.S. Cl.
CPC ............ *G10L 15/22* (2013.01); *G10L 15/063* (2013.01)

(58) Field of Classification Search
CPC . G10L 15/22; G10L 15/063; G10L 2015/025; G10L 15/02; G10L 15/04;
(Continued)

(56) References Cited

U.S. PATENT DOCUMENTS 9,190,056 B2 11/2015 Zhu
9,620,145 B2 4/2017 Bacchiani
(Continued)

FOREIGN PATENT DOCUMENTS

CN 101281745 A 10/2008
JP H06175678 A 6/1994
(Continued)

OTHER PUBLICATIONS

Kim, C., Gowda, D., Lee, D., Kim, J., Kumar, A., Kim, S., . . . & Han, C. (2020). A review of on-device fully neural end-to-end automatic speech recognition algorithms. arXiv preprint arXiv:2012.07974. (Year: 2020).*
(Continued)

*Primary Examiner* — Bhavesh M Mehta
*Assistant Examiner* — Philip H Lam
(74) *Attorney, Agent, or Firm* — Nixon & Vanderhye, P.C.

(57) ABSTRACT

Provided are an electronic device and a method of controlling an electronic device. The electronic device includes: a memory storing at least one instruction; and at least one processor configured to execute the at least one instruction, wherein one or more of the at least one processor is configured to: acquire a first vector corresponding to each of a plurality of sections of a voice signal by inputting the voice signal to a common encoder based on acquiring the voice signal; acquire a second vector corresponding to each of the plurality of sections and independent on a context of the voice signal by inputting the first vector into a first individual encoder; acquire a phoneme sequence corresponding to the second vector by inputting the second vector into a first decoder; acquire a third vector corresponding to at least two sections among the plurality of sections and dependent on the context of the voice signal by inputting the first
(Continued)

vectors into a second individual encoder; acquire a sub-word sequence corresponding to the third vector by inputting the third vector into a second decoder; and acquire text information corresponding to the plurality of sections by correcting the sub-word sequence based on the phoneme sequence, through a text information acquisition module.

15 Claims, 7 Drawing Sheets

(58) Field of Classification Search
CPC ......... G10L 15/06; G10L 15/16; G10L 15/18; G10L 15/1822; G10L 15/26; G10L 15/32; G06F 40/232; G06F 40/279
See application file for complete search history.

(56) References Cited

U.S. PATENT DOCUMENTS

| | | | | |
|---|---|---|---|---|
| 9,818,401 | B2 | 11/2017 | Printz | |
| 11,217,231 | B2 | 1/2022 | Prabhavalkar et al. | |
| 11,302,311 | B2 | 4/2022 | Kim et al. | |
| 12,100,388 | B2 | 9/2024 | Zhao | |
| 12,198,681 | B1 * | 1/2025 | Sunkara | G10L 15/16 |
| 2005/0149337 | A1 | 7/2005 | Asadi | |
| 2007/0239444 | A1 | 10/2007 | Ma | |
| 2020/0027445 | A1 * | 1/2020 | Raghunathan | G10L 15/32 |
| 2020/0234713 | A1 * | 7/2020 | Gowda | G06N 3/0455 |
| 2020/0286464 | A1 * | 9/2020 | Kurata | G10L 15/063 |
| 2020/0402501 | A1 * | 12/2020 | Prabhavalkar | G10L 15/16 |

FOREIGN PATENT DOCUMENTS

| | | | | |
|---|---|---|---|---|
| KR | 20030096862 A | 12/2003 | | |
| KR | 20110070688 A | 6/2011 | | |
| KR | 20180117942 A | 10/2018 | | |
| KR | 10-2236639 | 4/2021 | | |
| KR | 20220068679 A | 5/2022 | | |
| WO | 2007117814 A2 | 10/2007 | | |
| WO | WO-2022086252 A1 * | 4/2022 | | G06N 3/0455 |

OTHER PUBLICATIONS

Gowda, D., Garg, A., Kim, K., Kumar, M., & Kim, C. (Sep. 2019). Multi-Task Multi-Resolution Char-to-BPE Cross-Attention Decoder for End-to-End Speech Recognition. In Interspeech (pp. 2783-2787). (Year: 2019).*

Wang, W., Wang, G., Bhatnagar, A., Zhou, Y., Xiong, C., & Socher, R. (2020). An investigation of phone-based subword units for end-to-end speech recognition. arXiv preprint arXiv:2004.04290. (Year: 2020).*

International Search Report for PCT/KR2024/000350 mailed Apr. 11, 2024, 6 pages.

Written Opinion of the ISA for PCT/KR2024/000350 mailed Apr. 11, 2024, 4 pages.

D. Zhao, T. Sainath, D. Rybach, P. Rondon, D. Bhatia, B. Li, and R. Pang, "Shallow-fusion end-to-end contextual biasing," Proc. Interspeech, 2019, 5 pages.

M. Jain, G. Keren, J. Mahadeokar, and Y. Saraf, "Contextual RNN-T for open domain ASR," in Proc. Interspeech, 2020, 5 pages.

G. Pundak, T. Sainath, R. Prabhavalkar, A. Kannan, and D. Zhao, "Deep context: end-to-end contextual speech recognition," Proc. SLT, 2018, 8 pages.

J. Guo, T. N. Sainath, and R. J. Weiss, "A spelling correction model for end-to-end speech recognition," in Proc. ICASSP, 2019, 5 pages.

A. Garg, A. Gupta, D. Gowda, S. Singh, C. Kim, "Hierarchical Multi-Stage Word-to-Grapheme Named Entity Corrector for Automatic Speech Recognition," Proc. Interspeech, 2020, 5 pages.

X. Wang, Y. Liu, S. Zhao, J. Li, "A Light-weight contextual spelling correction model for customizing transducer-based speech recognition systems," Proc. Interspeech, 2021, 5 pages.

* cited by examiner

ELECTRONIC DEVICE AND CONTROLLING METHOD OF ELECTRONIC DEVICE

CROSS-REFERENCE TO RELATED APPLICATIONS

This application is a continuation of International Application No. PCT/KR2024/000350 designating the United States, filed on Jan. 8, 2024, in the Korean Intellectual Property Receiving Office and claiming priority to Korean Patent Application No. 10-2023-0002862, filed on Jan. 9, 2023, in the Korean Intellectual Property Office, the disclosures of each of which are incorporated by reference herein in their entireties.

BACKGROUND

Field

The disclosure relates to an electronic device and a controlling method of an electronic device, and for example, to an electronic device which may acquire text information corresponding to a voice signal, and a controlling method of an electronic device.

Description of the Related Art

In recent years, the development of technology for acquiring text information matching a user's speech intention by performing accurate voice recognition for a user voice has been accelerated in accordance with the development of technology related to an artificial intelligence (AI).

However, among the prior arts, there is technology considering a context of a voice signal received before a specific time point or a context of a voice signal of all sections received before and after the specific time point for a voice recognition model (e.g., automatic speech recognition (ASR) model) to fully reflect language information included in the voice signal. However, this prior art may utilize context-dependent encoder and decoder to be strongly biased by a previous word, and thus fail to accurately recognize a foreign word in particular.

Meanwhile, among the prior arts, there is technology performing voice recognition using a limited section of the voice signal. However, this prior art may not fully reflect the context of the voice signal to thus acquire a recognition result that does not match the user's speech intention.

SUMMARY

Embodiments of the disclosure provide an electronic device with improved accuracy of voice recognition by classifying encoders included in a voice recognition model into a context-independent encoder and a context-dependent encoder, and a controlling method of an electronic device.

According to various example embodiments of the disclosure, an electronic device includes: a memory storing at least one instruction; and at least one processor configured to execute the at least one instruction, wherein one or more of the at least one processor is configured to: acquire a first vector corresponding to each of a plurality of sections of a voice signal by inputting the voice signal to a common encoder based on acquiring the voice signal; acquire a second vector corresponding to each of the plurality of sections and independent on a context of the voice signal by inputting the first vector into a first individual encoder; acquire a phoneme sequence corresponding to the second vector by inputting the second vector into a first decoder; acquire a third vector corresponding to at least two sections among the plurality of sections and dependent on the context of the voice signal by inputting the first vectors into a second individual encoder; acquire a sub-word sequence corresponding to the third vector by inputting the third vector into a second decoder; and acquire text information corresponding to the plurality of sections by correcting the sub-word sequence based on the phoneme sequence, through a text information acquisition module.

The text information acquisition module may include a spell correction module, and the spell correction module may be configured to acquire the text information by correcting a spelling of the sub-word sequence based on the phoneme sequence based on identifying that the sub-word sequence violates a specified spelling.

The text information acquisition module may include a named entity correction module, and the named entity correction module may be configured to acquire the text information by correcting a named entity of the sub-word sequence based on the phoneme sequence based on identifying that the sub-word sequence is not included in a plurality of specified named entities.

The common encoder may be configured to learn to acquire the first vector suitable for both the first individual encoder and the second individual encoder without a specified constraint.

The first individual encoder may be configured to learn to acquire the second vector representing a feature of the phoneme sequence based on unlabeled learning data, and the first decoder may be configured to learn to acquire the phoneme sequence based on labeled learning data.

The second individual encoder may be configured to learn to acquire the third vector representing a feature of the sub-word sequence based on unlabeled learning data, and the second decoder may be configured to learn to acquire the sub-word sequence based on labeled learning data.

The at least two sections among the plurality of sections may include all the sections received before a specific time point among the plurality of sections or all the sections received before and after the specific time point among the plurality of sections.

According to various example embodiments of the disclosure, provided is a method of controlling an electronic device, the method including: acquiring a first vector corresponding to each of a plurality of sections of a voice signal by inputting the voice signal to a common encoder based on the voice signal being acquired; acquiring a second vector corresponding to each of the plurality of sections and independent on a context of the voice signal by inputting the first vector into a first individual encoder; acquiring a phoneme sequence corresponding to the second vector by inputting the second vector into a first decoder; acquiring a third vector corresponding to at least two sections among the plurality of sections and dependent on the context of the voice signal by inputting the first vectors into a second individual encoder; acquiring a sub-word sequence corresponding to the third vector by inputting the third vector into a second decoder; and acquiring text information corresponding to the plurality of sections by correcting the sub-word sequence based on the phoneme sequence, through a text information acquisition module.

The method may further comprise acquiring the text information by correcting a spelling of the sub-word sequence based on the phoneme sequence based on identifying that the sub-word sequence violates a specified spelling.

The method may further comprise acquiring the text information by correcting a named entity of the sub-word sequence based on the phoneme sequence based on identifying that the sub-word sequence is not included in a plurality of predefined named entities.

The method may further comprise learning to acquire the first vector suitable for both the first individual encoder and the second individual encoder without a specified constraint.

The method may further comprise learning to acquire the second vector representing a feature of the phoneme sequence based on unlabeled learning data, and learning to acquire the phoneme sequence based on labeled learning data.

The method may further comprise learning to acquire the third vector representing a feature of the sub-word sequence based on unlabeled learning data, and learning to acquire the sub-word sequence based on labeled learning data.

The at least two sections among the plurality of sections may include all the sections received before a specific time point among the plurality of sections or all the sections received before and after the specific time point among the plurality of sections.

According to various example embodiments of the disclosure, provided is a non-transitory computer-readable recording medium which includes a program which, when executed by one or more processors of at least one processor of an electronic device, causes the electronic device to perform operations comprising: acquiring a first vector corresponding to each of a plurality of sections of a voice signal by inputting the voice signal to a common encoder based on the voice signal being acquired; acquiring a second vector corresponding to each of the plurality of sections and independent on a context of the voice signal by inputting the first vector into a first individual encoder; acquiring a phoneme sequence corresponding to the second vector by inputting the second vector into a first decoder; acquiring a third vector corresponding to at least two sections among the plurality of sections and dependent on the context of the voice signal by inputting the first vectors into a second individual encoder; acquiring a sub-word sequence corresponding to the third vector by inputting the third vector into a second decoder; and acquiring text information corresponding to the plurality of sections by inputting the phoneme sequence and the sub-word sequence into a text information acquisition module.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
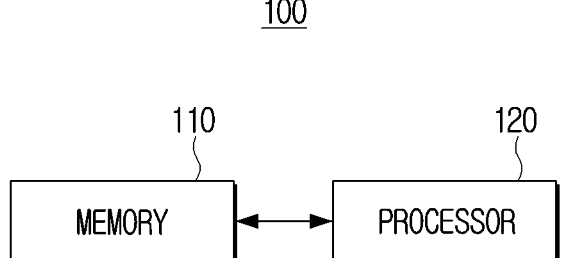
FIG. 1 is a block diagram illustrating an example configuration of an electronic device according to various embodiments.

The disclosure may be variously modified and disclose various example embodiments, and various embodiments of the disclosure are thus shown in the drawings and described in detail in the detailed description. However, it is to be understood that the scope of the disclosure is not limited to the example embodiments, and includes various modifications, equivalents and/or alternatives according to the embodiments of the disclosure. Throughout the accompanying drawings, similar components are denoted by similar reference numerals.

In describing the disclosure, the description may not include a detailed description of a case where the detailed description of the known functions or configurations related to the disclosure is determined to unnecessarily obscure the gist of the disclosure.

In addition, the following embodiments may be modified in various different forms, and the scope and spirit of the disclosure are not limited to the following embodiments. Rather, these embodiments are provided to make the disclosure thorough and complete, and to convey the spirit of the disclosure to those skilled in the art.

Terms used in the disclosure are used to describe the various embodiments rather than limiting the scope of the disclosure. A term of a singular number may include its plural number unless explicitly indicated otherwise in the context.

In the disclosure, an expression "have," "may have," "include," "may include" or the like, indicates existence of a corresponding feature (for example, a numerical value, a function, an operation or a component such as a part), and does not exclude existence of an additional feature.

In the disclosure, an expression "A or B", "least one of A and/or B", "one or more of A and/or B" or the like, may include all possible combinations of items enumerated together. For example, "A or B," "at least one of A and B" or "at least one of A or B" may indicates all of 1) a case where at least one A is included, 2) a case where at least one B is included, or 3) a case where both of at least one A and at least one B are included.

Expressions "first," "second" and the like, used in the disclosure may indicate various components regardless of the sequence or importance of the components. The expression is used only to distinguish one component from another component, and does not limit the corresponding component.

In case that any component (for example, a first component) is mentioned to be "(operatively or communicatively) coupled with/to" or "connected to" another component (for example, a second component), it is to be understood that any component is directly coupled to another component or coupled to another component through still another component (for example, a third component).

On the other hand, in case that any component (for example, the first component) is disclosed to be "directly coupled to" or "directly connected to" another component (for example, the second component), it is to be understood that still another component (for example, the third component) is not present between any component and another component.

An expression "configured (or set) to" used in the disclosure may be replaced by an expression "suitable for," "having the capacity to," "designed to," "adapted to," "made to" or "capable of" based on a situation. The expression "configured (or set) to" may not necessarily indicate "specifically designed to" in hardware.

Instead, an expression "a device configured to" in any situation may indicate that the device may "perform~" together with another device or component. For example, "a processor configured (or set) to perform A, B and C" may indicate a dedicated processor (for example, an embedded processor) that may perform the corresponding operations or a generic-purpose processor (for example, a central processing unit (CPU) or an application processor) that may perform the corresponding operations by executing one or more software programs stored in a memory device. The term "processor" may include various processing circuitry (as used herein, including the claims, the term "processor" may include various processing circuitry, including at least one processor, wherein one or more processors of the at least one processor may be configured to perform the various functions described herein).

In the embodiments, a "module" or a "~er/or" may perform at least one function or operation, and be implemented by hardware or software, or be implemented by a combination of hardware and software. In addition, a plurality of "modules" or a plurality of "~ers/ors" may be integrated in at least one module and implemented by at least one processor (and may include executable program instructions to be executed by one or more processors of at least one processor) except for a "module" or an "~er/or" that needs to be implemented by specific hardware.

Meanwhile, various elements and regions in the drawings are schematically shown. Therefore, the spirit of the disclosure is not limited by relative sizes or intervals shown in the accompanying drawings.

Hereinafter, various example embodiments of the disclosure are described in greater detail with reference to the accompanying drawings.

Figure 2:
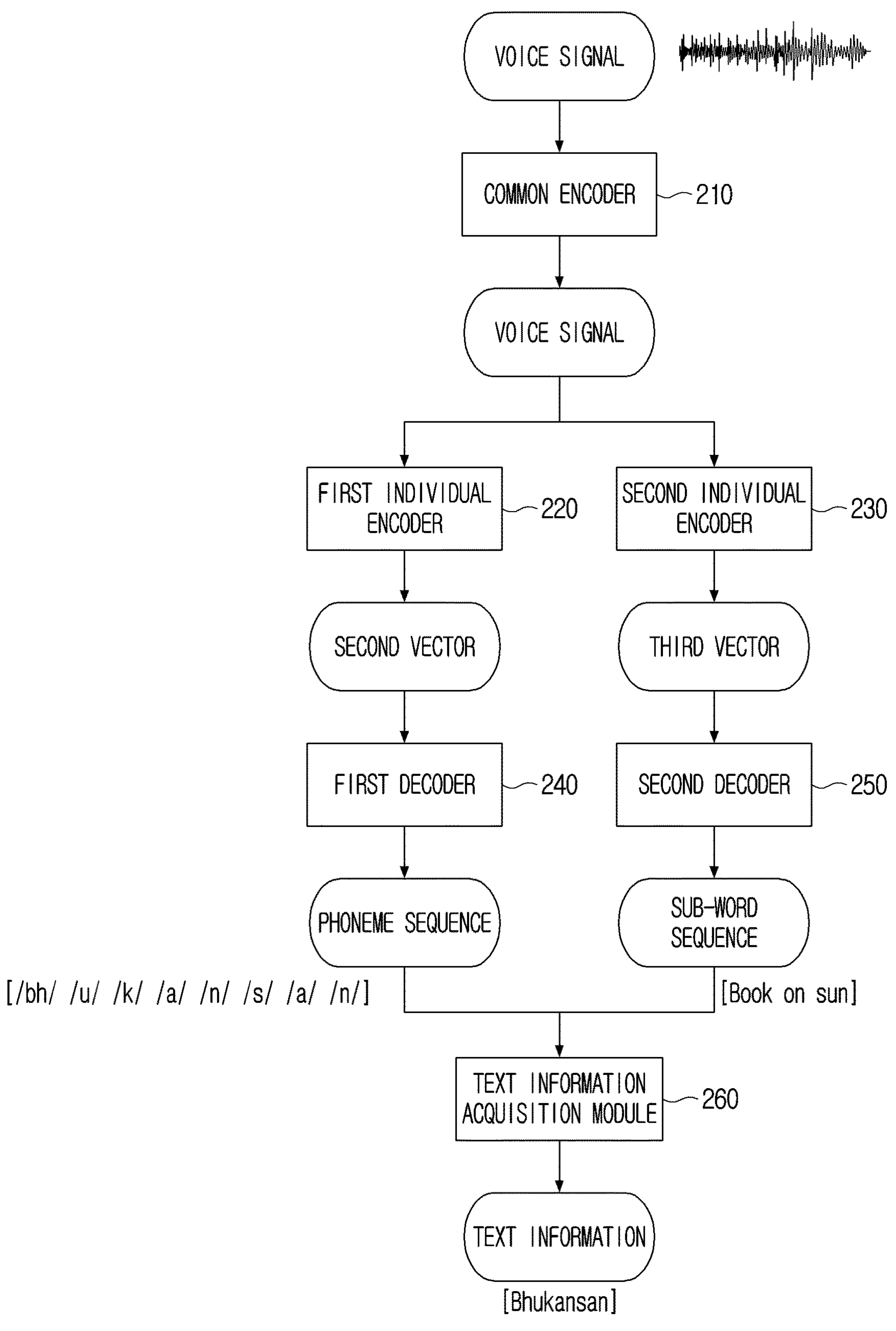
FIG. 2 is a diagram illustrating a plurality of modules and input/output data on each of the plurality of modules according to various embodiments.

FIG. 1 is a block diagram illustrating an example configuration of an electronic device 100 according to various embodiments. FIG. 2 is a diagram illustrating a plurality of modules and input/output data of each of the plurality of modules according to various embodiments. Hereinafter, various example embodiments of the disclosure are described in greater detail with reference to FIGS. 1 and 2.

The electronic device 100 according to the disclosure refers to a device which may acquire text information corresponding to a voice signal. For example, the electronic device 100 may acquire the text information corresponding to the voice signal using a neural network model performing voice recognition, and particularly perform correction such as spelling correction in a process of acquiring the text information.

The electronic device 100 according to the disclosure may be implemented as a server including a neural network model performing the voice recognition, is not limited thereto, may be implemented as a user terminal such as a smartphone or a tablet personal computer (PC), or may be implemented as an edge computing device. The electronic device 100 according to the disclosure is not limited to any particular type.

The memory 110 may store at least one instruction related to the electronic device 100. In addition, the memory 110 may store an operating system O/S driving the electronic device 100. In addition, the memory 110 may store various software programs or applications operating the electronic device 100 according to the various embodiments of the disclosure. In addition, the memory 110 may include a semiconductor memory such as a flash memory, or a magnetic storing medium such as a hard disk.

For example, the memory 110 may store various software modules operating the electronic device 100 according to the various embodiments of the disclosure, and a processor 120 may execute the various software modules stored in the memory 110 to thus control an operation of the electronic device 100. The memory 110 may be accessed by the processor 120, and the processor 120 may perform readout, recording, correction, deletion, update and the like of data therein.

Meanwhile, the term "memory 110" in the disclosure may include the memory 110, a read only memory (ROM, not shown) or a random access memory (RAM, not shown) in the processor 120, or a memory card (not shown) mounted on the electronic device 100 (for example, a micro secure digital (SD) card or a memory stick).

The memory 110 according to the various embodiments of the disclosure may store the voice signal, first vector, second vector, third vector, phoneme sequence, sub-word sequence, text information or the like of the disclosure. In addition, the memory 110 may store data for implementing the plurality of modules according to the disclosure and data for training the plurality of modules.

The memory 110 may store various information necessary to achieve the purpose of the disclosure, and the information stored in the memory 110 may be updated as the information is received from an external device or input by a user.

The processor 120 may include various processing circuitry (as used herein, including the claims, the term "processor" may include various processing circuitry, including at least one processor, wherein one or more processors of the at least one processor may be configured to perform the various functions described herein) and control an overall operation of the electronic device 100. The processor 120 may be connected to components of the electronic device 100 including the memory 110, and control the overall operation of the electronic device 100 by executing at least one instruction stored in the memory 110 as described above.

The processor 120, as noted above, may be implemented in various ways. For example, the processor 120 may be implemented as at least one of an application specific integrated circuit (ASIC), an embedded processor, a microprocessor, a hardware control logic, a hardware finite state machine (FSM) or a digital signal processor (DSP). Meanwhile, the term "processor 120" in the disclosure may be used to include a central processing unit (CPU), a graphic processing unit (GPU), a main processing unit (MPU) or the like.

The processor 120 according to the various embodiments of the disclosure may acquire the text information corresponding to the voice signal using the plurality of modules. As shown in FIG. 2, the plurality of modules according to the disclosure may include a common encoder 210, a first individual encoder 220, a second individual encoder 230, a first decoder 240, and a second decoder 250, and a text information acquisition module 260.

The plurality of modules may be implemented as a software module (e.g., including various executable program instructions) and/or a hardware module, and at least some of the plurality of modules may be integrated into one module, or another module other than the modules shown in FIG. 2 may be included in the plurality of modules. In other words, as used herein, the term "module" may include various circuitry (including processing circuitry) and/or executable program instructions. The plurality of modules may include a neural network, and a type of the neural network included in the plurality of modules is not particularly limited. The overall configuration including the plurality of modules may be referred to as the neural network model or a voice recognition model (e.g., automatic speech recognition (ASR) model), some of the plurality of modules may be included in one neural network model, or another module may be included in another neural network model.

The description below describes a case where the plurality of modules are all included in the electronic device 100 as an on-device, and the disclosure is not limited thereto. In various embodiments of the disclosure, some of the plurality of modules may be included in the electronic device 100 and others may be included in the external device. The description below describes a process in which the processor 120 uses the plurality of modules to thus implement the various embodiments of the disclosure.

The processor 120 may acquire the voice signal. The processor 120 may acquire the voice signal by receiving the voice signal through a microphone included in the electronic device 100, or may acquire the voice signal by receiving the voice signal from the external device through a communication device 130. In an example illustrated in FIG. 2, it is assumed that the voice signal is the voice signal acquired as the user speaks a word "Bhukansan".

The processor 120 may acquire the first vector corresponding to each of a plurality of sections of the voice signal by inputting the voice signal to the common encoder 210 in case of acquiring the voice signal. In the disclosure, the common encoder 210 may refer, for example, to a module which may acquire the first vector corresponding to each of the plurality of sections of the received voice signal. The common encoder 210 may be replaced by a term "shared encoder" in that this encoder is used for both the first individual encoder 220 and the second individual encoder 230. The common encoder 210 may learn to acquire the first vector suitable for both the first individual encoder 220 and the second individual encoder 230 described below without a predetermined (e.g., specified) constraint.

The common encoder 210 may include a module required to learn to acquire the first vector to be delivered to both the context-independent first individual encoder 220 and the context-dependent second individual encoder 230, and thus required not to be limited by loss occurring due to prior learning. The first vector may be a hidden representation acquired based on a limited context of a limited section of the voice signal.

The processor 120 may acquire the second vector corresponding to each of the plurality of sections and independent on a context of the voice signal by inputting the first vector to the first individual encoder 220.

In the disclosure, the first individual encoder 220 may refer, for example, to a module which may acquire the second vector independent on the context of the voice signal. The first individual encoder 220 may learn to acquire the second vector representing a feature of the phoneme sequence based on unlabeled learning data.

In case of receiving the first vector corresponding to each of the plurality of sections from the common encoder 210, the first individual encoder 220 may acquire the context-independent second vector based on a voice signal limited to each of the plurality of sections, and transmit the second vector to the first decoder 240. Accordingly, the first individual encoder 220 may be referred to as the context-independent encoder. The second vector may be independent on the context of the voice signal in that the second vector is acquired based on the limited section of the voice signal, and the second vector may be referred to as a hidden phoneme representation in that the second vector is used for acquiring the phoneme sequence described below.

The processor 120 may acquire the phoneme sequence corresponding to the second vector by inputting the second vector to the first decoder 240. In the disclosure, the first decoder 240 refers to a module which may acquire the phoneme sequence corresponding to the second vector. The first decoder 240 may learn to acquire the phoneme sequence based on labeled learning data.

In case of receiving the second vector from the first individual encoder 220, the first decoder 240 may acquire the phoneme sequence corresponding to the second vector and transmit the phoneme sequence to the text information acquisition module 260. The phoneme sequence may be acquired based on the second vector, which is independent on the context of the voice signal, and thus also be independent on the context of the voice signal. Accordingly, the first decoder 240 may be referred to as the context-independent decoder. Meanwhile, the first vector may be acquired for each of the plurality of sections of the voice signal, and the second vector may also be acquired for each of the plurality of sections of the voice signal. However, the phoneme sequence is a combination of phonemes for each of the plurality of sections, and may thus correspond to all the sections of the voice signal.

As shown in the example of FIG. 2, the phoneme sequence acquired by the first decoder 240 may be [/bh//u//k//a//n//s//a//n/]. Each phoneme included in the phoneme sequence is expressed in a format such as/phoneme/. The phoneme sequence may be context-independent, and thus be information for clearly expressing a pronunciation of the voice signal.

Meanwhile, the processor 120 may acquire the third vector corresponding to at least two sections among the plurality of sections and dependent on the context of the voice signal by inputting the first vectors to the second individual encoder 230. In the disclosure, the second individual encoder 230 refers to a module which may acquire the third vector dependent on the context of the voice signal. The second individual encoder 230 may learn to acquire the third vector representing a feature of the sub-word sequence based on the unlabeled learning data.

In case of receiving the first vector corresponding to each of the plurality of sections from the common encoder 210, the second individual encoder 230 may acquire the context-dependent third vector based on an unlimited voice signal of at least two sections among the plurality of sections, and transmit the third vector to the second decoder 250.

At least two sections among the plurality of sections may be all the sections received before a specific time point among the plurality of sections or all the sections received before and after the specific time point among the plurality of sections. In case of receiving the first vector corresponding to each of the limited sections of the voice signal, the second individual encoder 230 may acquire the third vector including a left-only context commonly used in a streaming voice recognition model (e.g., automatic speech recognition (ASR) model), or the third vector including a full context commonly used in a full-context ASR model (or a causal ASR model). Meanwhile, a length of the section (or interval) according to the disclosure may depend on a developer's setting or the user's setting. The description describes the plurality of sections in greater detail below with reference to FIG. 5.

The third vector may be dependent on the context of the voice signal in that the third vector is not limited to each of the plurality of sections of the voice signal and is acquired based on the voice signal received before and after the specific time point. Accordingly, the second individual encoder 230 may be referred to as the context-dependent encoder, and the third vector may be referred to as a hidden sub-word representation acquired based on the unlimited sections of the voice signal.

The processor 120 may acquire the sub-word sequence corresponding to the third vector by inputting the third vector to the second decoder 250. In the disclosure, the second decoder 250 refers to a module which may acquire the sub-word sequence corresponding to the third vector. The second decoder 250 may learn to acquire the sub-word sequence based on the labeled learning data. In the disclosure, the sub-word sequence refers to a set of sequentially connected sub-words, and a sub-word refers to a component representing a meaning of a smaller unit included in a meaning of a word. In various embodiments, the second decoder may be implemented to acquire a word sequence in which words themselves are sequentially connected with each other. However, the second decoder may use the sub-word sequence instead of the word sequence to alleviate a problem of processing a word that does not exist in the learning data (e.g., an out-of-vocabulary (OoV) word or an unknown token (UNK)) or a new word.

In case of receiving the third vector from the second individual encoder 230, the second decoder 250 may acquire the sub-word sequence corresponding to the third vector and transmit the sub-word sequence to the text information acquisition module 260. The sub-word sequence may be acquired based on the third vector, which is dependent on the context of the voice signal, and thus also be dependent on the context of the voice signal. Accordingly, the second decoder 250 may be referred to as the context-dependent decoder. Meanwhile, even in case that the third vector fails to entirely correspond to each of the plurality of sections of the voice signal, the sub-word sequence is a combination of the sub-words in some sections, and may thus correspond to all the sections of the voice signal.

As shown in the example of FIG. 2, the sub-word sequence acquired by the second decoder 250 may be [Book on sun]. That is, the sub-word sequence acquired by the second decoder 250 is not limited to a specific section of the voice signal, and may be acquired in consideration of the context of the voice signal. Therefore, unlike the phoneme sequence acquired by the first decoder 240, the sub-word sequence may clarify the language information included in the voice signal.

The processor 120 may acquire the text information corresponding (e.g., entirely corresponding) to the plurality of sections by correcting the sub-word sequence based on the phoneme sequence, through the text information acquisition module 260. In the disclosure, the text information acquisition module 260 refers to a module which may acquire the text information corresponding to the entire voice signal based on the phoneme sequence and the sub-word sequence.

The text information acquisition module 260 may identify whether the sub-word sequence needs to be corrected, and acquire the text information by correcting the sub-word sequence based on the phoneme sequence in case of identifying that the sub-word sequence needs to be corrected. On the other hand, the text information acquisition module 260 may acquire the text information based on the sub-word sequence without correcting the sub-word sequence in case of identifying that the sub-word sequence does not need to be corrected. The description describes a process of identifying whether the sub-word sequence needs to be corrected in greater detail below with reference to FIGS. 3 and 4.

As described above, the phoneme sequence acquired by the context-independent first decoder 240 may clearly express the pronunciation of the voice signal, and the sub-word sequence acquired by the context-dependent second decoder 250 may clearly express the language information included in the voice signal. The text information acquisition module 260 may learn to acquire that text information for clearly expressing the language information included in the voice signal while clearly expressing the pronunciation of the voice signal. Meanwhile, both the phoneme sequence and the sub-word sequence may correspond to all the sections of the voice signal, and the text information may thus also correspond to all the sections of the voice signal.

The text information acquisition module 260 may acquire accurate text information corresponding to a user voice by correcting the sub-word sequence based on the phoneme sequence. As shown in the example of FIG. 2, the text information acquired by the text information acquisition module 260 may be [Bhukansan]. That is, the sub-word sequence is [Book on sun] in the example of FIG. 2. However, the text information acquisition module 260 may acquire the text information [Bhukansan] that matches a word spoken by the user by correcting the sub-word sequence [Book on sun] using the phoneme sequence [/bh//u//k//a//n//s//a//n/]. The description describes a process of correcting the sub-word sequence through the text information acquisition module 260 in greater detail below with reference to FIGS. 3 and 4.

In case that the text information is acquired as described above, the acquired text information itself may be provided to the user. However, the acquired text information may be used to control an operation of the electronic device or an operation of the external device by matching the information with an instruction for controlling the operation of the electronic device or the operation of the external device.

The disclosure describes hereinabove various embodiments in which the phoneme sequence acquired by the first decoder 240. However, in various embodiments, a grapheme sequence may be acquired instead of the phoneme sequence. The grapheme sequence may refer, for example, to an individual letter or a group of letters representing one phoneme. In addition, the description describes hereinabove various embodiments in which the sub-word sequence is acquired by the second decoder 250. However, any subconcept included in a word may be the sub-word according to the disclosure.

An ASR model may, for example, acquire the text information of the voice signal by performing the learning using the voice signal of all the sections received before the specific time point among the plurality of sections or all the sections received before and after the specific time point among the plurality of sections without performing the learning using the limited section of the voice signal. The ASR model in the prior art may utilize the context-dependent encoder and decoder to be strongly biased by a previous word, and thus may fail to accurately recognize a foreign word in particular.

On the other hand, the electronic device 100 according to the disclosure may classify the encoders into the context-independent encoder and the context-dependent encoder. As a result, the electronic device 100 may train the context-independent encoder to use the voice signal of the limited section to thus concentrate on an individual phoneme without being biased to the language information, thereby acquiring the phoneme sequence representing an actual pronunciation. Accordingly, the electronic device 100 may perform a result of accurate voice recognition of the voice signal by performing spell correction or named entity correction based on the phoneme sequence.

Figure 3:
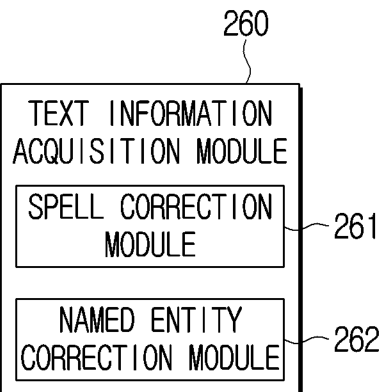
FIG. 3 is a block diagram illustrating various example modules of a text information acquisition module according to various embodiments.
Figure 4:
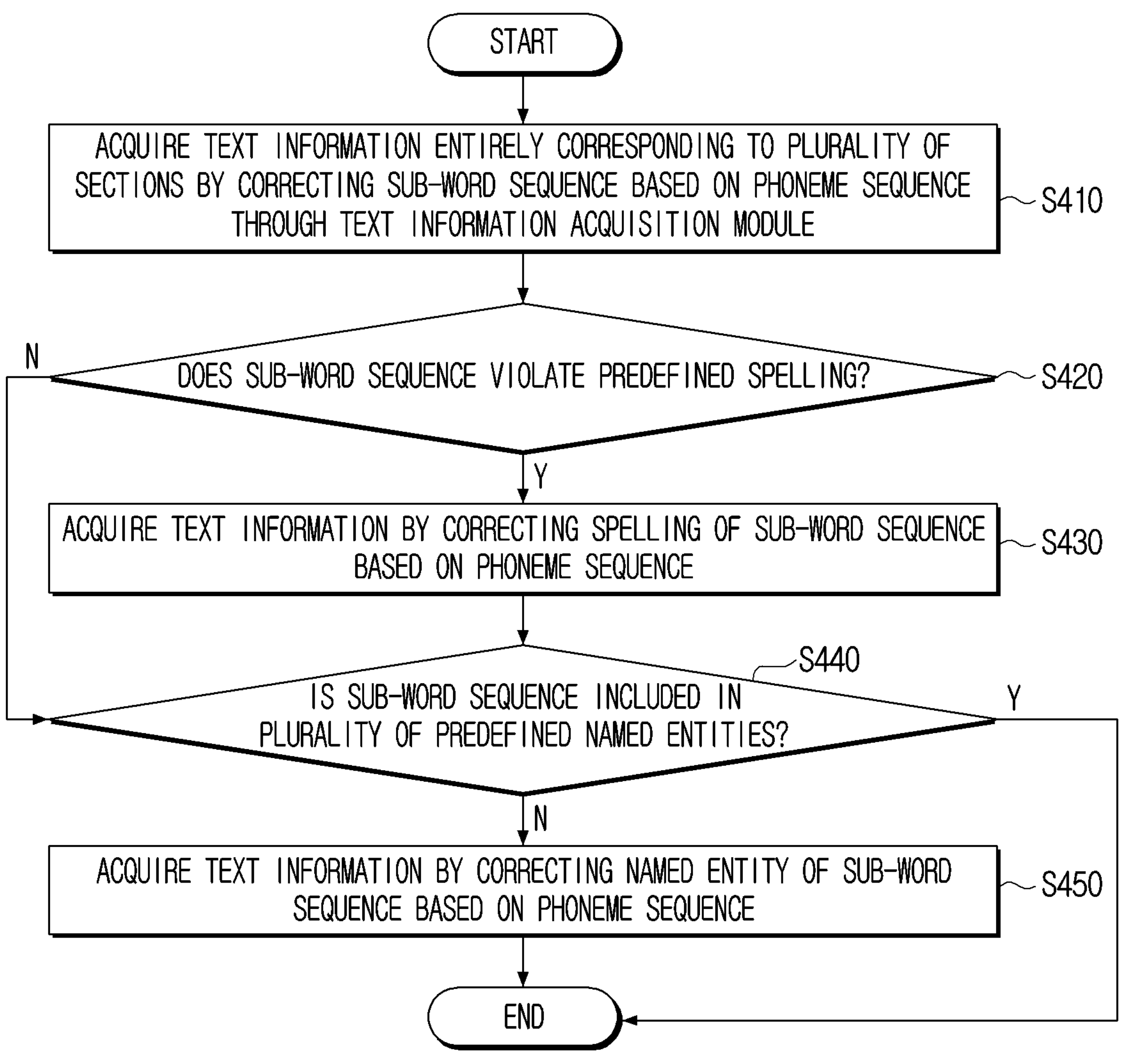
FIG. 4 is a flowchart illustrating an example controlling method according to various embodiments.
Figure 5:
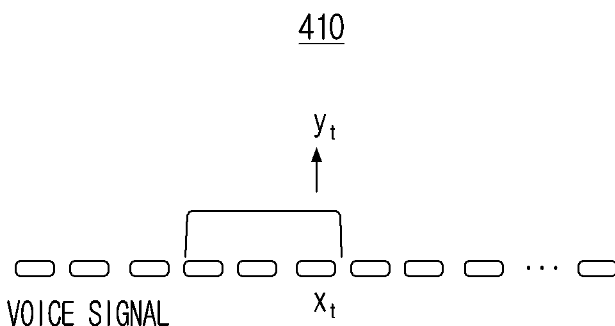
FIG. 5 is a diagram illustrating a plurality of sections of a voice signal according to various embodiments.
Figure 5:
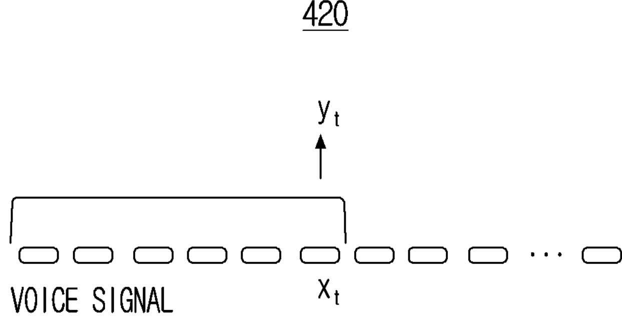
Figure 5:
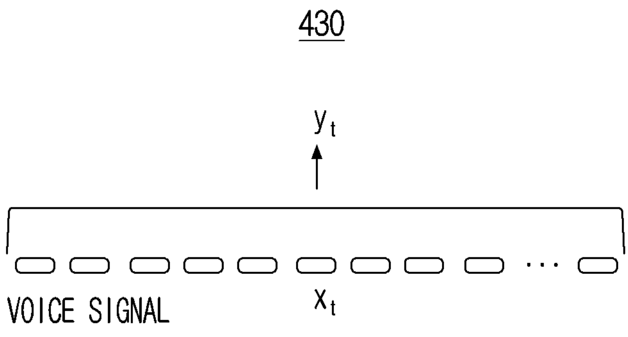

FIG. 3 is a block diagram illustrating various example modules of the text information acquisition module 260 according to various embodiments of the disclosure. In addition, FIG. 4 is a flowchart illustrating an example method according to various embodiments and FIG. 5 is a diagram illustrating the plurality of sections of the voice signal according to various embodiments of the disclosure. Hereinafter, various embodiments of the disclosure are described in greater detail below with reference to FIGS. 3 and 4.

The text information acquisition module 260 according to various embodiments of the disclosure may include at least one of a spell correction module 261 and a named entity correction module 262. Each of the "modules" may include various circuitry, including, for example, various processing circuitry, and/or executable program instructions. The text information acquisition module 260 may include only one module among the spell correction module 261 and the named entity correction module 262. However, the description below is provided based on an assumption that the text information acquisition module 260 includes both the spell correction module 261 and the named entity correction module 262.

As described above with reference to FIGS. 1 and 2, and referring to FIG. 4, the processor 120 may acquire the text information corresponding to the plurality of sections of the voice signal by correcting the sub-word sequence based on the phoneme sequence (S410).

The spell correction module 261 refers to a module which may acquire a correct text sequence by correcting an incorrect spelling included in a text sequence. The spell correction module 261 may identify whether the sub-word sequence violates a predefined spelling (S420). The spell correction module 261 may then acquire the text information by correcting a spelling of the sub-word sequence based on the phoneme sequence (S430) in case of identifying that the sub-word sequence violates the predefined spelling (S420-Y). On the other hand, the spell correction module 261 may not correct the spelling of the sub-word sequence, and the next operation may be performed by the named entity correction module 262 in case of identifying that the sub-word sequence does not violate the predefined spell (S420-N).

In various embodiments, the spell correction module 261 may include a phoneme encoder encoding the phoneme sequence, a sub-word encoder encoding the sub-word sequence, and an attention decoder outputting an accurate sub-word sequence based on outputs of the phoneme encoder and the sub-word sequence.

The named entity correction module 262 refers to a module which may acquire the correct text sequence by correcting an incorrect named entity included in the text sequence. The named entity correction module 262 may identify a named entity corresponding to the text sequence using information on the plurality of named entities, which are words corresponding to predefined person, company, place, time, unit, and the like. For example, with reference to FIG. 4, the named entity correction module 262 may identify whether the sub-word sequence is included in the plurality of predefined named entities (S440). The named entity correction module 262 may then acquire the text information by correcting the named entity of the sub-word sequence based on the phoneme sequence (S450) in case of identifying that the sub-word sequence is not included in the plurality of predefined named entities (S440-N). On the other hand, the named entity correction module 262 may not correct the named entity of the sub-word sequence in case of identifying that the sub-word sequence is included in the plurality of predefined named entities (S440-Y). In this case, the text information acquisition module 260 may acquire the text information corresponding to the sub-word sequence.

A process of correcting the spelling by the spell correction module 261 and a process of correcting the named entity by the named entity correction module 262 may be performed using an edit distance. The edit distance may refer, for example, to the minimum number of character deletions, insertions, and substitutions required to convert the sub-word sequence into the text information having the correct spell or named entity. For example, the spell correction module 261 may acquire the text information having the correct spell by calculating the edit distance between the phoneme sequence and candidate text sequences including the correct spell.

The description provided with reference to FIG. 2 describes an example in which the text information [Bhukansan] is acquired using the phoneme sequence [/bh//u//k//a//n//s//a//n/] to correct the sub-word sequence [Book on sun], and may suggest various other examples.

For example, the text information acquisition module 260 may acquire the text information [Gyeongbokgung] using a phoneme sequence [/g//y//eo//ng//b//o//k//g//u//ng/] to correct a sub-word sequence [Jumbo gum] or [Jungle gym], or acquire text information [Gyeonggi-do] using the phoneme sequence [/g//y//eo//n//g//i//d//o/] to correct a sub-word sequence [Young dido].

FIG. 5 is a diagram illustrating an example of the plurality of sections a voice signal according to various embodiments.

As shown in FIG. 5, vectors representing the voice signal or a feature of the voice signal according to the disclosure may be expressed as a continuous sequence. In FIG. 5, $x_t$ denotes a specific time point of the sequence, and $y_t$ denotes a unit of the sequence output by the encoder or the decoder at the specific time point $x_t$.

As described above, the common encoder 210 according to the disclosure may output the first vector corresponding to each of the plurality of sections of the voice signal. In addition, the first individual encoder 220 may output the second vector corresponding to each of the plurality of sections and independent on the context of the voice signal based on the first vector. As shown in 410 of FIG. 5, the common encoder 210 and the first individual encoder 220 may respectively output the first vector and the second vector at the specific time point $x_t$ by processing the voice signal of the limited section which ranges from a previous time point to the specific time point $x_t$ and which is a time period corresponding to one section based on the specific time point $x_t$. A length of one section may depend on the developer's setting or the user's setting.

The second individual encoder 230 according to the disclosure may output the third vector corresponding to at least two sections among the plurality of sections of the voice signal based on the first vectors. At least two sections among the plurality of sections may include all the sections received before the specific time point among the plurality of sections or all the sections received before or after the specific time point among the plurality of sections. For convenience of explanation, the description uses the expression "two or more sections". However, in various embodiments, a section that includes more time than one section may correspond to a section of the third vector according to the disclosure.

As shown in 420 of FIG. 5, the second individual encoder 230 may output the third vector by processing the first vectors of the limited sections which range from a previous time point to the specific time point $x_t$ and which are time periods corresponding to two sections based on the specific time point $x_t$. The second individual encoder 230 may convert the first vector corresponding to the entire voice signal received before the specific time point $x_t$ into the third vector and output the converted third vector. The second individual encoder 230 may output the third vector including the left-only context commonly used in the voice recognition model (e.g., automatic speech recognition (ASR) model) in case of receiving the first vector corresponding to each of the limited sections of the voice signal.

As shown in 430 of FIG. 5, the second individual encoder 230 may convert the first vector corresponding to the entire voice signal received not only before the specific time point $x_t$ but also after the specific time point $x_t$ into the third vector, and output the same. The second individual encoder 230 may acquire the third vector including the full context commonly used in the full-context ASR model (or the causal ASR model) in case of receiving the first vector corresponding to each of the limited sections of the voice signal. In other words, the second individual encoder 230 may acquire the third vector by even using the first vector corresponding to the voice signal received after the specific time point $x_t$ upon outputting the third vector corresponding to the specific time point $x_t$.

As shown in 420 or 430 of FIG. 5, the prior art may include the context-dependent encoder and decoder using the voice signal of all the sections received before the specific time point among the plurality of sections or all the sections received before and after the specific time point among the plurality of sections. Accordingly, the context-dependent encoder and decoder may be strongly biased by the previous word.

On the other hand, the electronic device 100 according to the disclosure may include a process of processing a context-independent path (e.g., paths of the first individual encoder 220 and the first decoder 240) using the voice signal of the limited section, as shown in the first image 410 of FIG. 5, as well as context-dependent paths like the prior art (e.g., paths of the second individual encoder 230 and the second decoder 250). Accordingly, the electronic device 100 may acquire the phoneme sequence representing the actual pronunciation without being biased to the language information, and may correct the sub-word sequence using the phoneme sequence.

Figure 6:
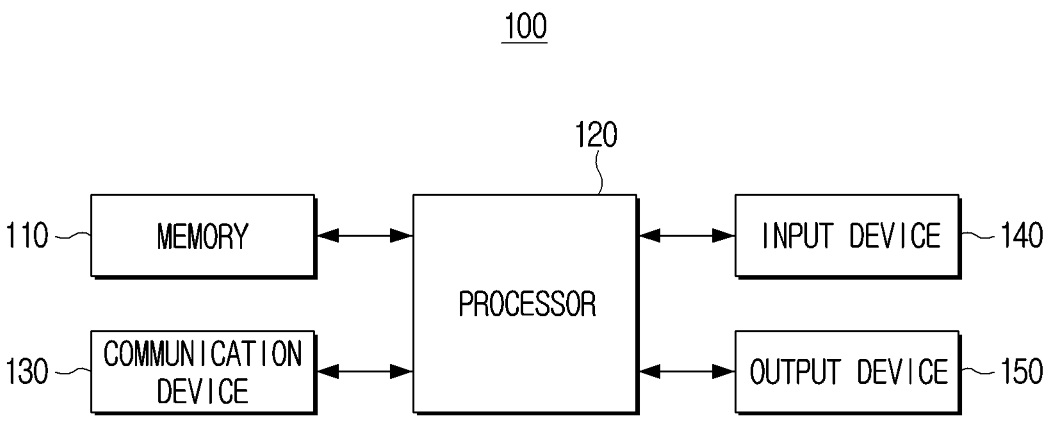
FIG. 6 is a block diagram illustrating an example configuration of the electronic device according to various embodiments.

FIG. 6 is a block diagram illustrating an example configuration of the electronic device 100 according to various embodiments.

As shown in FIG. 6, the electronic device 100 according to various embodiments may further include the communication device (e.g., including communication circuitry) 130, an input device (e.g., including input circuitry) 140, and an output device (e.g., including output circuitry) 150. However, the configurations shown in FIGS. 1 and 6 are only examples. A new component may be added to the configurations shown in FIGS. 1 and 6 or some components may be omitted to practice the disclosure.

The communication device 130 may include a circuit and communicate with the external device. The processor 120 may receive various data or information from the external device connected thereto through the communication device 130, and transmit the various data or information to the external device.

The communication device 130 may include at least one of a wireless fidelity (WiFi) module, a Bluetooth module, a wireless communication module, a near field communication (NFC) module, or an ultra wide band (UWB) module. The WiFi module and the Bluetooth module may respectively perform the communication using a WiFi method and a Bluetooth method. In case of using the WiFi module or the Bluetooth module, the communication device 130 may first transmit and receive various connection information such as a service set identifier (SSID), connect the communication using this connection information, and transmit and receive the various information.

In addition, the wireless communication module may perform the communication based on various communication protocols such as institute of electrical and electronics engineers (IEEE), zigbee, $3^{rd}$ generation (3G), 3rd generation partnership project (3GPP), long term evolution (LTE), and 5th Generation (5G). In addition, the NFC module may perform the communication using an NFC method that uses a 13.56 MHz band among various radio frequency identification (RF-ID) frequency bands such as 135 kHz, 13.56 MHz, 433 MHz, 860 to 960 MHz and 2.45 GHz. In addition, the UWB module may accurately measure time of arrival (ToA), which is time at which a pulse reaches a target, and an angle of arrival (AoA), which is an angle of arrival of a pulse at a transmission device, through the communication between UWB antennas, and may thus perform accurate distance and position recognition within an error range of several tens of centimeters (cm) indoors.

According to the various embodiments of the disclosure, the processor 120 may receive the voice signal from the external device through the communication device 130, and receive a user command for performing the voice recognition on the voice signal. In addition, the processor 120 may control the communication device 130 to transmit, to the external device, at least one of the first vector, second vector, third vector, phoneme sequence, sub-word sequence, and text information of the disclosure.

The input device 140 may include a circuit, and the processor 120 may receive a user command for controlling the operation of the electronic device 100 through the input device 140. The input device 140 may include a component such as the microphone, a camera (not shown) or a remote control signal receiver (not shown). In addition, the input device 140 may be implemented as a touch screen included in a display. In particular, the microphone may receive the voice signal and convert the received voice signal into an electrical signal.

According to the various embodiments of the disclosure, the processor 120 may receive the user command for performing the voice recognition on the voice signal through the input device 140. In addition, the processor 120 may receive a user command for setting sizes of the plurality of sections according to the disclosure through the input device 140.

The output device 150 may include a circuit, and the processor 120 may output various functions that the electronic device 100 may perform through the output device 150. In addition, the output device 150 may include at least one of the display, a speaker, and an indicator.

The display may output image data under control of the processor 120. The display may output an image pre-stored in the memory 110 under the control of the processor 120.

The display according to various embodiments of the disclosure may display a user interface stored in the memory 110. The display may be implemented as a liquid crystal display panel (LCD), an organic light emitting diode (OLED) or the like, and the display may be implemented as a flexible display, a transparent display or the like in some cases. However, the display according to the disclosure is not limited to a particular type. The speaker may output audio data under the control of the processor 120, and the indicator may be turned on under the control of the processor 120.

According to the various embodiments of the disclosure, the processor 120 may control the output device 150 to output the text information according to the disclosure. In addition, the processor 120 may control the output device 150 to provide the sub-word sequence according to the disclosure that has no spell correction or no named entity correction together with the text information having the correct spell or named entity.

Figure 7:
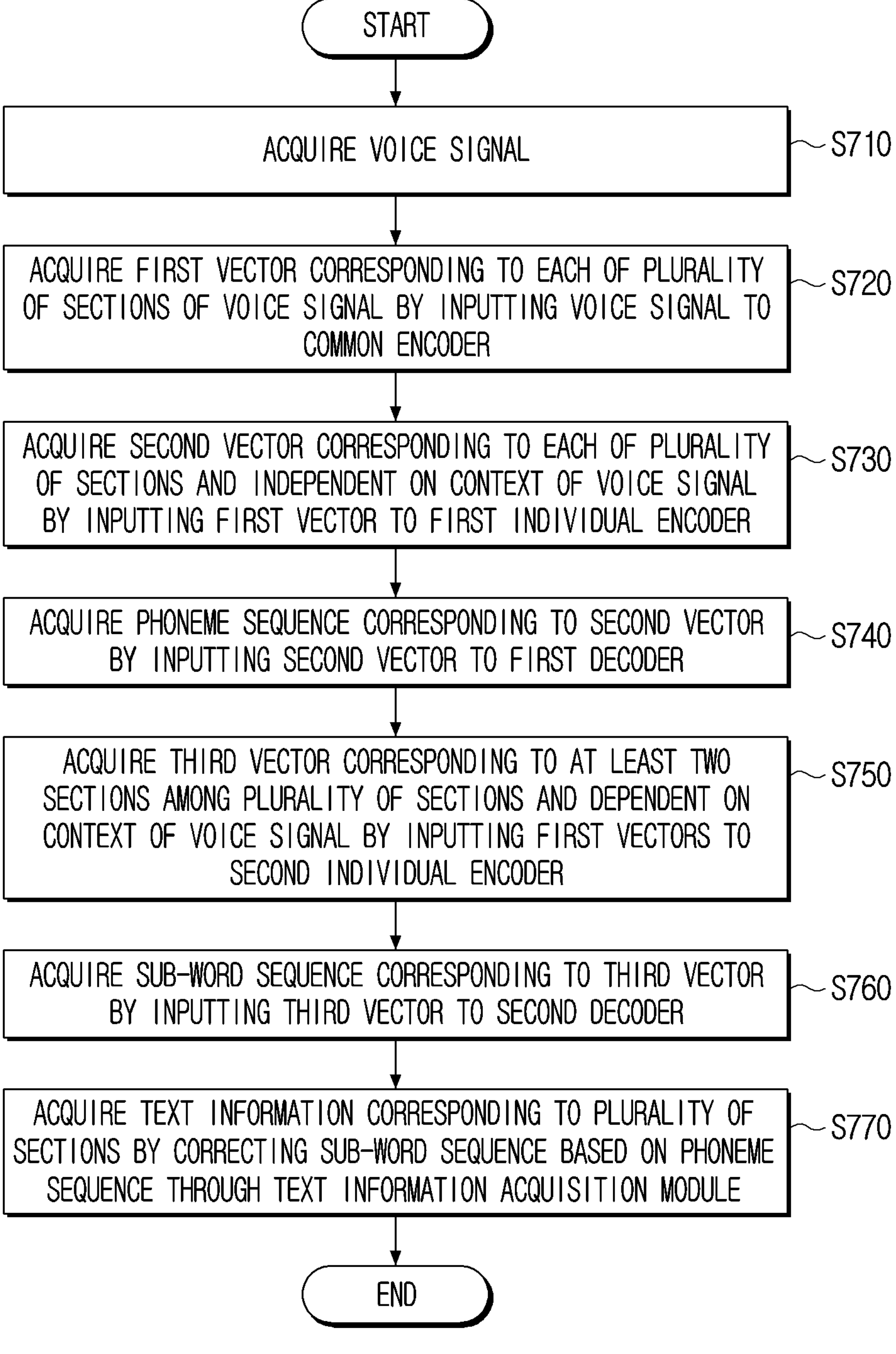
FIG. 7 is a flowchart illustrating an example method of controlling an electronic device according to various embodiments.

FIG. 7 is a flowchart illustrating an example method of controlling an electronic device 100 according to various embodiments.

As shown in FIG. 7, the electronic device 100 may acquire the voice signal (S710). The electronic device 100 may acquire the voice signal by receiving the voice signal through the microphone included in the electronic device 100, or may acquire the voice signal by receiving the voice signal from the external device through the communication device 130.

The electronic device 100 may acquire the first vector corresponding to each of the plurality of sections of the voice signal by inputting the voice signal to the common encoder 210 based on acquiring the voice signal (S720). The common encoder 210 may learn to acquire the first vector suitable for both the first individual encoder 220 and the second individual encoder 230 described below without the predetermined constraint.

The electronic device 100 may acquire the second vector corresponding to each of the plurality of sections and independent on the context of the voice signal by inputting the first vector to the first individual encoder 220 in case of acquiring the first vector (S730). Based on acquiring the first vector corresponding to each of the plurality of sections, the electronic device 100 may acquire the context-independent second vector based on the voice signal limited to each of the plurality of sections.

The processor 120 may acquire the phoneme sequence corresponding to the second vector by inputting the second vector to the first decoder 240 in case of acquiring the second vector (S740). The electronic device 100 may acquire the phoneme sequence corresponding to the second vector in case of acquiring the second vector.

The electronic device 100 may acquire the third vector corresponding to at least two sections among the plurality of sections and dependent on the context of the voice signal by inputting the first vectors to the second individual encoder 230 based on acquiring the first vector (S750). In case of acquiring the first vector, the electronic device 100 may acquire the context-dependent third vector based on the unlimited voice signal of at least two sections among the plurality of sections.

The electronic device 100 may acquire the sub-word sequence corresponding to the third vector by inputting the third vector to the second decoder 250 based on acquiring the third vector (S760). The electronic device 100 may acquire the sub-word sequence corresponding to the third vector in case of acquiring the third vector.

The electronic device 100 may acquire the text information corresponding to the plurality of sections by correcting the sub-word sequence based on the phoneme sequence, through the text information acquisition module 260 based on acquiring the phoneme sequence and the sub-word sequence (S770). The electronic device 100 may identify whether the sub-word sequence needs to be corrected, and acquire accurate text information corresponding to the user voice by correcting the sub-word sequence based on the phoneme sequence in case of identifying that the sub-word sequence needs to be corrected.

The method of controlling the electronic device 100 according to various embodiments as described above may be implemented as a program and provided to the electronic device 100. The program including the controlling method of the electronic device 100 may be stored and provided in a non-transitory computer-readable medium.

The non-transitory computer-readable recording medium may include a program which, when executed by one or more processors of the at least one processor of the electronic device, causes the electronic device to perform operations comprising: acquiring a first vector corresponding to each of a plurality of sections of a voice signal by inputting the voice signal to a common encoder based on the voice signal being acquired; acquiring a second vector corresponding to each of the plurality of sections and independent on a context of the voice signal by inputting the first vector into a first individual encoder; acquiring a phoneme sequence corresponding to the second vector by inputting the second vector into a first decoder; acquiring a third vector corresponding to at least two sections among the plurality of sections and dependent on the context of the voice signal by inputting the first vectors into a second individual encoder; acquiring a sub-word sequence corresponding to the third vector by inputting the third vector into a second decoder; and acquiring text information corresponding to the plurality of sections by inputting the phoneme sequence and the sub-word sequence into a text information acquisition module.

The description above briefly describes the controlling method of controlling the electronic device 100 and the computer-readable recording medium including the program executing the controlling method of the electronic device 100. However, the various embodiments of the electronic device 100 may also be applied to the controlling method of the electronic device 100 and the computer-readable recording medium including the program executing the controlling method of the electronic device 100.

According to various embodiments of the disclosure as described above, the electronic device 100 may classify the encoders into the context-independent encoder and the context-dependent encoder. As a result, the electronic device 100 may train the context-independent encoder to use the voice signal of the limited section to thus concentrate on the individual phoneme without being biased to the language information, thereby acquiring the phoneme sequence representing the actual pronunciation. Accordingly, the electronic device 100 may perform the result of the accurate voice recognition of the voice signal by performing the spell correction or the named entity correction based on the phoneme sequence.

A function related to an artificial intelligence according to the disclosure may be operated by the processor 120 and memory 110 of the electronic device 100.

The processor 120 may be at least one processor. Here, at least one processor may include at least one of the central processing unit (CPU), the graphic processing unit (GPU), or a neural processing unit (NPU), and is not limited to the above examples of the processor 120. As noted above, the processor 120 may include various processing circuitry, and, as used herein, including the claims, the term "processor" may include various processing circuitry, including at least one processor, wherein one or more processors of the at least one processor may be configured to perform the various functions described herein.

The CPU may refer, for example, to a generic-purpose processor 120 which may perform not only general calculations but also artificial intelligence calculations, and may efficiently execute complex programs through a multi-layered cache structure. The CPU may be advantageous for a serial processing method that enables organic linkage between a previous calculation result and the next calculation result through sequential calculation. The generic—purpose processor 120 is not limited to the above examples except for a case where the processor is specified as the above-mentioned CPU.

The GPU may refer, for example, to a processor 120 for large-scale operations such as floating-point operations used for graphics processing, and may perform the large-scale operations in parallel by integrating a large number of cores. In particular, the GPU may be advantageous for a parallel processing method such as a convolution operation or the like compared to the CPU. In addition, the GPU may be used as a co-processor to supplement a function of the CPU. The processor 120 for the large-scale operations is not limited to the above example except for a case where the processor is specified as the above-mentioned GPU.

The NPU may refer, for example, to a processor 120 specialized in artificial intelligence calculation using an artificial neural network, and each layer included in the artificial neural network may be implemented in hardware (e.g., silicon). The NPU is specially designed based on requirements of a company, and may thus have a lower degree of freedom than the CPU or the GPU. However, the NPU may efficiently process the artificial intelligence calculation required by the company. Meanwhile, as the processor specialized for the artificial intelligence calculation, the NPU may be implemented in various forms such as a tensor processing unit (TPU), an intelligence processing unit (IPU), or a vision processing unit (VPU). The artificial intelligence processor 120 is not limited to the above example except for a case where the processor is specified as the above-mentioned NPU.

In addition, at least one processor 120 may be implemented in a system on chip (SoC). Here, the SoC may further include the memory 110 and a network interface such as a bus for data communication between the processor 120 and the memory 110 in addition to at least one processor 120.

In case that the system on chip (SoC) included in the electronic device 100 includes a plurality of processors 120, the electronic device 100 may use some of the plurality of processors 120 to perform the artificial intelligence calculation (e.g., calculation related to the learning or inference of an artificial intelligence model). For example, the electronic device 100 may perform the artificial intelligence calculation using at least one of the GPU, NPU, VPU, TPU, or a hardware accelerator that is specialized for the artificial intelligence calculation such as convolution calculation and matrix multiplication calculation among the plurality of processors. However, this is only an example, and the artificial intelligence calculation may be processed using the generic-purpose processor 120 such as the CPU.

In addition, the electronic device 100 may perform calculation for a function related to the artificial intelligence using multi-cores (e.g., dual-core or quad-core) included in the at least one processor 120. In particular, the electronic device 100 may perform the artificial intelligence calculation such as the convolution calculation and the matrix multiplication calculation in parallel using the multi-cores included in the processor 120.

One or more of the at least one processor 120 may perform the control to process the input data based on a predefined action rule or the artificial intelligence model, stored in the memory 110. The predefined action rule or the artificial intelligence model may be acquired by the learning.

Here, "acquired by the learning" may indicate that the predefined action rule or artificial intelligence model of a desired feature is acquired by applying a learning algorithm to a lot of learning data. Such learning may be performed on a device itself on which the artificial intelligence is performed according to the disclosure, or by a separate server/system.

The artificial intelligence model may include a plurality of neural network layers. At least one layer has at least one weight value, and calculation of the layer may be performed through an operation result of a previous layer and at least one defined operation. Examples of the neural network may include, for example, and without limitation, a convolutional neural network (CNN), a deep neural network (DNN), a recurrent neural network (RNN), a restricted Boltzmann machine (RBM), a deep belief network (DBN), a bidirectional recurrent deep neural network (BRDNN), a deep Q-network, a transformer, or the like. However, the neural network of the disclosure is not limited to the above examples except for a case where a type of the neural network is specified.

The learning algorithm may refer, for example, to a method of training a predetermined target device (e.g., robot) using a large number of learning data for the predetermined target device to make a decision or a prediction for itself. The learning algorithms may include, for example, a supervised learning algorithm, an unsupervised learning algorithm, a semi-supervised learning algorithm, or a reinforcement learning algorithm. However, the learning algorithm of the disclosure is not limited to the above-described examples, unless specified otherwise.

The machine-readable storage medium may be provided in the form of a non-transitory storage medium. Here, the "non-transitory storage medium" may refer to a tangible device and indicate that this storage medium does not include a signal (for example, an electromagnetic wave). For example, the "non-transitory storage medium" may include a buffer in which data is temporarily stored.

According to various embodiments, the methods according to the various embodiments disclosed in the disclosure may be provided by being included in a computer program product. The computer program product may be traded as a product between a seller and a purchaser. The computer program product may be distributed in a form of the machine-readable storage medium (e.g., compact disc read only memory (CD-ROM)), or may be distributed online (e.g., downloaded or uploaded) through an application store (e.g., PlayStore™) or directly between two user devices (e.g., smartphones). In case of the online distribution, at least a part of the computer program product (e.g., downloadable app) may be at least temporarily stored or temporarily provided in the machine-readable storage medium such as a memory 110 included in a server of a manufacturer, a server of an application store, or a relay server.

Each of components (for example, modules or programs) according to the various embodiments of the disclosure described above may include a single entity or a plurality of entities, and some of the corresponding sub-components described above may be omitted or other sub-components may be further included in the various embodiments. Alternatively or additionally, some of the components (e.g., modules or programs) may be integrated into one entity, and may perform functions performed by the respective corresponding components before being integrated in the same or similar manner.

Operations performed by the modules, the programs or other components according to the various embodiments may be executed in a sequential manner, a parallel manner, an iterative manner or a heuristic manner, at least some of the operations may be performed in a different order or be omitted, or other operations may be added.

Meanwhile, the term "~er/~or" or "module" used in the disclosure may include a unit including hardware, software or firmware, or any combination thereof, and may be used interchangeably with the term, for example, a logic, a logic block, a component or a circuit. The "~er/~or" or "module" may be an integrally formed component, or a minimum unit or part performing one or more functions. For example, the module may include an application-specific integrated circuit (ASIC).

The various embodiments of the disclosure may be implemented by software including an instruction stored in the machine-readable storage medium (for example, the computer readable storage medium). A machine may be an apparatus that invokes the stored instruction from the storage medium, may be operated based on the invoked instruction, and may include the electronic device (for example, the electronic device 100) according to the disclosed embodiments.

In case the instruction is executed by the processor 120, the processor 120 may perform a function corresponding to the instruction directly or using other components under the control of the processor 120. The instruction may include a code provided or executed by a compiler or an interpreter.

While the disclosure has been illustrated and described with reference to various example embodiments, it will be understood that the various example embodiments are intended to be illustrative, not limiting. For example, the disclosure is not limited to the embodiments described above, and may be variously modified by those skilled in the art to which the disclosure pertains without departing from the true spirit and full scope of the disclosure including the accompanying claims. These modifications should also be understood to fall within the scope and spirit of the disclosure. It will also be understood that any of the embodiment(s) described herein may be used in conjunction with any other embodiment(s) described herein.

What is claimed is:

1. An electronic device comprising:

a memory storing at least one instruction; and at least one processor configured to execute the at least one instruction, wherein one or more of the at least one processor is configured to:

acquire a first vector corresponding to each of a plurality of sections of a voice signal by inputting the voice signal to a common encoder based on acquiring the voice signal;

acquire a second vector corresponding to each of the plurality of sections and independent on a context of the voice signal by inputting the first vector into a first individual encoder;

acquire a phoneme sequence corresponding to the second vector by inputting the second vector into a first decoder;

acquire a third vector corresponding to at least two sections among the plurality of sections and dependent on the context of the voice signal by inputting the first vectors into a second individual encoder;

acquire a sub-word sequence corresponding to the third vector by inputting the third vector into a second decoder; and acquire text information corresponding to the plurality of sections by correcting the sub-word sequence based on the phoneme sequence, through a text information acquisition module.

2. The device as claimed in claim 1, wherein the text information acquisition module comprises circuitry including a spell correction module comprising circuitry, and the spell correction module is configured to acquire the text information by correcting a spelling of the sub-word sequence based on the phoneme sequence based on identifying that the sub-word sequence violates a specified spelling.

3. The device as claimed in claim 1, wherein the text information acquisition module comprises circuitry including a named entity correction module comprising circuitry, and the named entity correction module is configured to acquire the text information by correcting a named entity of the sub-word sequence based on the phoneme sequence based on identifying that the sub-word sequence is not included in a plurality of specified named entities.

4. The device as claimed in claim 1, wherein the common encoder is configured to learn to acquire the first vector suitable for both the first individual encoder and the second individual encoder without a specified constraint.

5. The device as claimed in claim 1, wherein the first individual encoder is configured to learn to acquire the second vector representing a feature of the phoneme sequence based on unlabeled learning data, and the first decoder is configured to learn to acquire the phoneme sequence based on labeled learning data.

6. The device as claimed in claim 1, wherein the second individual encoder is configured to learn to acquire the third vector representing a feature of the sub-word sequence based on unlabeled learning data, and the second decoder is configured to learn to acquire the sub-word sequence based on labeled learning data.

7. The device as claimed in claim 1, wherein the at least two sections among the plurality of sections include all sections received before a specific time point among the plurality of sections or all the sections received before and after the specific time point among the plurality of sections.

8. A method of controlling an electronic device, the method comprising:

acquiring a first vector corresponding to each of a plurality of sections of a voice signal by inputting the voice signal to a common encoder based on the voice signal being acquired;

acquiring a second vector corresponding to each of the plurality of sections and independent on a context of the voice signal by inputting the first vector into a first individual encoder;

acquiring a phoneme sequence corresponding to the second vector by inputting the second vector into a first decoder;

acquiring a third vector corresponding to at least two sections among the plurality of sections and dependent on the context of the voice signal by inputting the first vectors into a second individual encoder;

acquiring a sub-word sequence corresponding to the third vector by inputting the third vector into a second decoder; and acquiring text information corresponding to the plurality of sections by correcting the sub-word sequence based on the phoneme sequence, through a text information acquisition module.

9. The method as claimed in claim 8, further comprising acquiring the text information by correcting a spelling of the sub-word sequence based on the phoneme sequence based on identifying that the sub-word sequence violates a specified spelling.

10. The method as claimed in claim 8, further comprising acquiring the text information by correcting a named entity of the sub-word sequence based on the phoneme sequence based on identifying that the sub-word sequence is not included in a plurality of specified named entities.

11. The method as claimed in claim 8, further comprising learning to acquire the first vector suitable for both the first individual encoder and the second individual encoder without a specified constraint.

12. The method as claimed in claim 8, further comprising: learning to acquire the second vector representing a feature of the phoneme sequence based on unlabeled learning data, and learning to acquire the phoneme sequence based on labeled learning data.

13. The method as claimed in claim 8, further comprising: learning to acquire the third vector representing a feature of the sub-word sequence based on unlabeled learning data, and learning to acquire the sub-word sequence based on labeled learning data.

14. The method as claimed in claim 8, wherein the at least two sections among the plurality of sections include all sections received before a specific time point among the plurality of sections or all the sections received before and after the specific time point among the plurality of sections.

15. A non-transitory computer-readable recording medium including a program which, when executed by one or more of at least one processor of an electronic device, cause the electronic device to perform operations comprising:

acquiring a first vector corresponding to each of a plurality of sections of a voice signal by inputting the voice signal to a common encoder based on the voice signal being acquired;

acquiring a second vector corresponding to each of the plurality of sections and independent on a context of the voice signal by inputting the first vector into a first individual encoder;

acquiring a phoneme sequence corresponding to the second vector by inputting the second vector into a first decoder;

acquiring a third vector corresponding to at least two sections among the plurality of sections and dependent on the context of the voice signal by inputting the first vectors into a second individual encoder;

acquiring a sub-word sequence corresponding to the third vector by inputting the third vector into a second decoder; and acquiring text information corresponding to the plurality of sections by inputting the phoneme sequence and the sub-word sequence into a text information acquisition module.

* * * * *